Figure 1A:
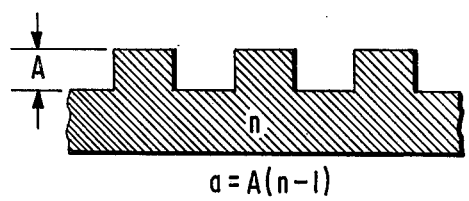

United States Patent [19]

Knop

[11] 4,057,326
[45] Nov. 8, 1977

[54] SIMPLIFIED AND IMPROVED DIFFRACTIVE SUBTRACTIVE COLOR FILTERING TECHNIQUE

[75] Inventor: Karl Knop, Zurich, Switzerland
[73] Assignee: RCA Corporation, New York, N.Y.
[21] Appl. No.: 694,441
[22] Filed: June 9, 1976
[30] Foreign Application Priority Data
   May 27, 1976  United Kingdom ............... 51272/76
[51] Int. Cl.² ........................... G02B 5/18; G02B 5/22
[52] U.S. Cl. ........................ 350/162 R; 350/162 SF; 350/314
[58] Field of Search .............. 350/314, 162 R, 162 SF

[56] References Cited
U.S. PATENT DOCUMENTS 3,504,606  4/1970  Macovski ....................... 350/162 SF
3,957,354  5/1976  Knop ............................. 350/162 SF Primary Examiner—John K. Corbin
Assistant Examiner—John D. Lee
Attorney, Agent, or Firm—H. Christoffersen; Samuel Cohen; George J. Seligsohn

[57] ABSTRACT

The present invention takes advantage of the fact that the first and second optical depths of a diffractive subtractive color filter respectively manifesting cyan and yellow zero-order diffraction light may be so selected that an optical depth equal to the sum of the first and second optical depths manifests green zero-order diffraction light. This permits a variable optical amplitude first grating, manifesting cyan, yellow and green, to be combined with a fixed optical amplitude second grating, manifesting magenta, to provide a full gamut of colors.

11 Claims, 5 Drawing Figures

SIMPLIFIED AND IMPROVED DIFFRACTIVE SUBTRACTIVE COLOR FILTERING TECHNIQUE

BACKGROUND OF THE INVENTION

1. Field of the Invention

This invention relates to an improved and simplified diffractive subtractive color filtering technique.

2. Description of the Prior Art

U.S. Pat. No. 3,957,354, issued May 18, 1976 to Knop and assigned to the same assignee as the present application, discloses a diffractive subtractive color filtering technique. More specifically, as taught in U.S. Pat. No. 3,957,354, the illumination of a square-wave diffraction phase grating (or other equivalent binary phase delay diffractive structure) with polychromatic (white) light results in the zero diffraction order light emerging therefrom exhibiting a particular color hue determined solely by the optical amplitude of the phase grating. In principle, such a phase grating may be either a reflective phase grating, or a transmissive phase grating. A transmissive phase grating may be manifested by differences in indices of refraction and/or a surface relief pattern in a transparent medium. However, in practice, the most suitable type of phase grating is a surface relief pattern embossed in a transparent medium, such as a sheet of plastic, having an index of diffraction different from the surrounding air. In the case of such a surface relief pattern in a transparent medium, the optical amplitude of the diffraction grating is equal to the product of the physical amplitude of the grating relief pattern multiplied by the difference between the index of refraction of the transparent medium and that of the surrounding air.

As further taught in the aforesaid U.S. Pat. No. 3,957,354, a diffractive subtractive color filter manifesting color pictures can be achieved by the superposition of three square-wave phase gratings (or other equivalent binary phase delay diffractive structures) which either have different line spacings and/or are angularly-displayed with respect to each other by a suitable angle (e.g. 60°) and each of which has a different preselected optical amplitude corresponding to a different one of the three subtractive primary colors (cyan, magenta and yellow).

As is further taught in the aforesaid U.S. Pat. No. 3,957,354, a conventional slide projector, microfiche viewer or motion picture projector may be employed to display a color picture obtained from a diffractive subtractive color filter. This results from the fact that the effective line frequency of each of the three superimposed diffraction gratings is sufficiently high to deflect all the higher diffraction orders beyond the aperture of the projection lens of the projector, so that only the respective zero diffraction orders of each of the superimposed diffraction gratings passes through the projection lens of the projector and is displayed.

A color picture recorded as three superimposed diffraction gratings (or other equivalent binary phase delay diffractive structures) in the form of one or more surface relief patterns involves eight different depth parameters. In particular, white light is manifested by a zero depth level; cyan light is manifested by the depth of a first of three superimposed gratings; magenta is manifested by the depth of a second of the three superimposed gratings; yellow is manifested by the depth of a third of the three superimposed gratings; blue is manifested by the three depths equal to each of the first and second of the three superimposed gratings and their sum; green is manifested by the three depths equal to each of the first and third of the three superimposed gratings and their sum; red is manifested by the three depths equal to each of the second and third of the three superimposed gratings and their sum; and black is manifested by the seven depths equal to each of the first, second and third of the three superimposed gratings and all possible sums thereof taken both two at a time and all three at a time. It would greatly simplify the fabrication of color pictures in the form of diffractive subtrative filters if it were not necessary to use as many as three independent gratings, superimposed in different combinations to obtain the eight different colors.

SUMMARY OF THE INVENTION

In accordance with the principles of the present invention, only two gratings (or other equivalent diffractive structures) at most need be superimposed to obtain the eight different colors, white, cyan, magenta, yellow, blue, green, red and black. More specifically, it has been found that there is a first particular square-wave grating optical amplitude corresponding to cyan zero-diffraction order light, a second particular square-wave grating optical amplitude corresponding to yellow zero diffraction order light, and a third particular square-wave grating optical amplitude corresponding to green zero diffraction order light, in which the first, second and third particular optical amplitudes are so related that the third particular optical amplitude is just equal to the sum of the first and second optical amplitudes. Therefore, green light may be produced directly by a single square-wave grating (or other equivalent diffractive structures) having the third particular optical amplitude. Thus, it is no longer necessary to superimpose two independent square-wave gratings, one having an optical amplitude manifesting cyan and the other having an amplitude manifesting yellow, to derive green by the subtractive mixture of two primary colors. However, this fortuitous relationship, where the optical amplitude manifesting green is exactly equal to the sum of the respective optical amplitudes manifesting cyan and yellow, is unique.

Thus, in accordance with the principles of the present invention, a diffractive subtractive color filter may comprise only two superimposed angularly-displaced diffractive structures, such as square-wave gratings, to achieve a full gamut of color hues. The first of these two diffractive structures has a variable optical amplitude which equal either a first given optical amplitude that corresponds to cyan, a second given optical amplitude that corresponds to yellow, or an optical amplitude which is substantially equal to the sum of the first and second given optical amplitude and that corresponds to green. The second of these two diffractive structures has a fixed optical amplitude which corresponds to magenta. Of course, the first variable optical amplitude diffractive structure could be used alone, if desired, should a full gamut of color hues not be required.

Figure 1:
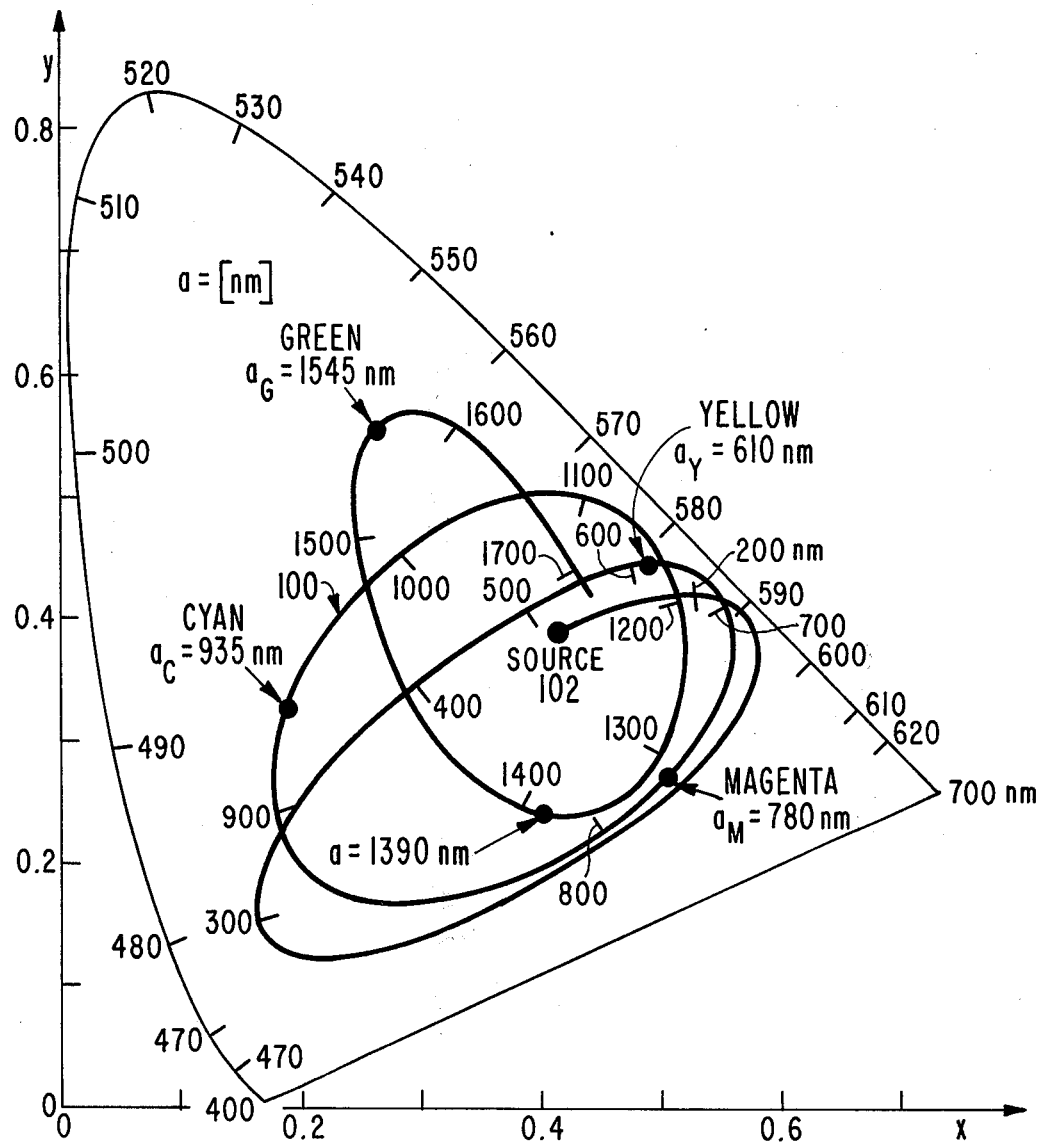
Figure 2:
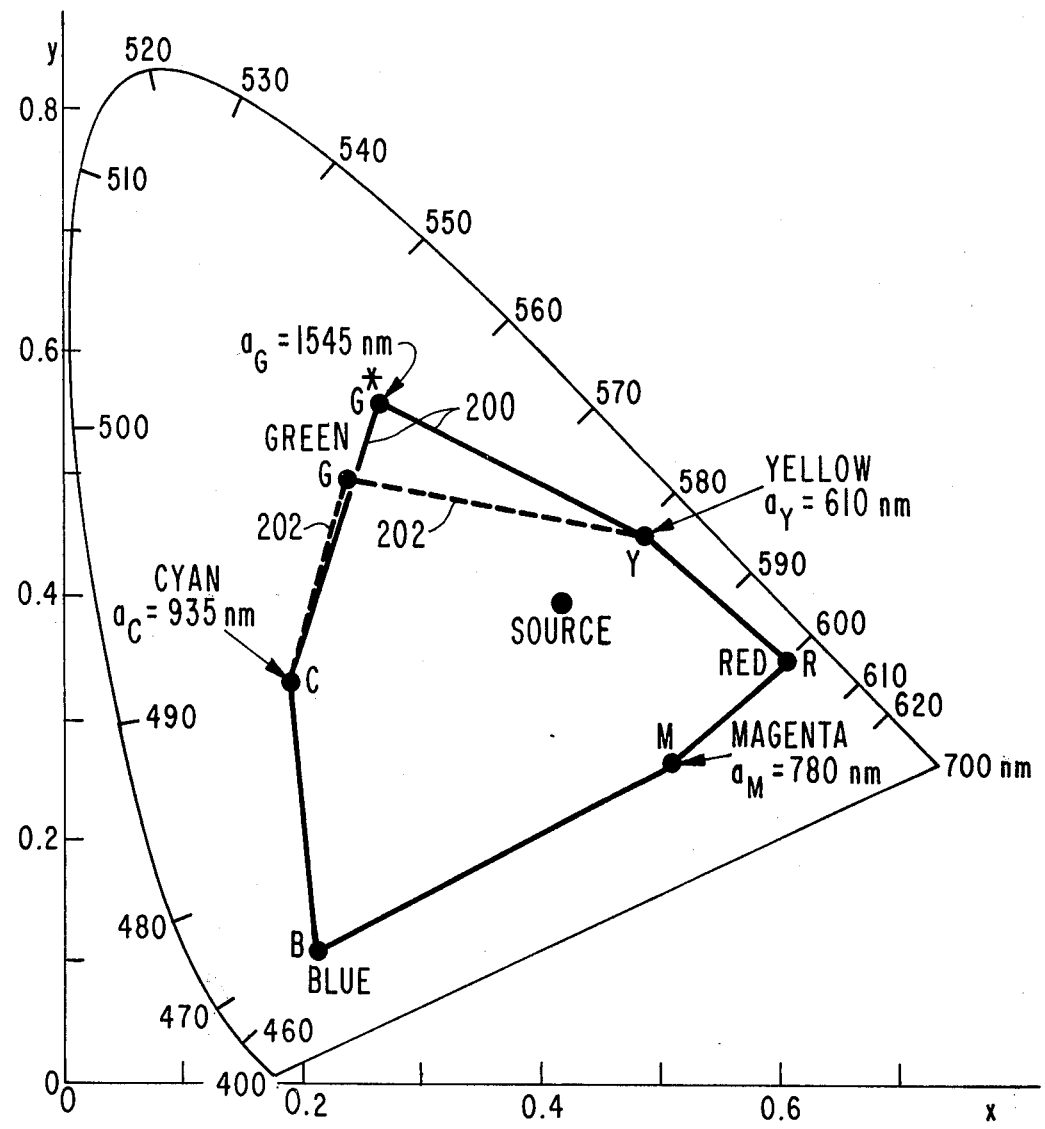
Figure 3:
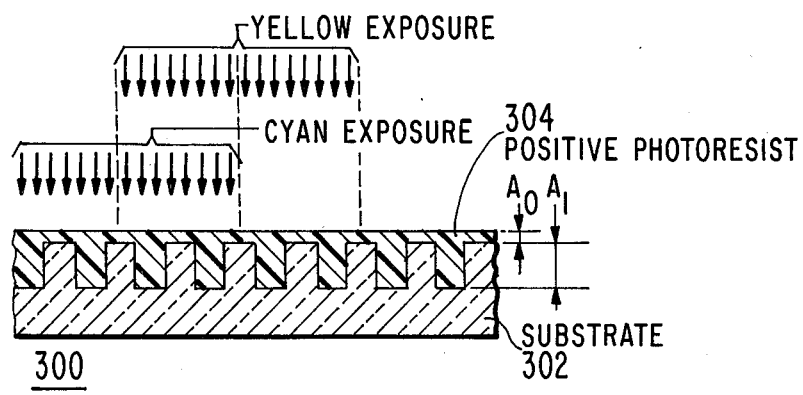
Figure 4:
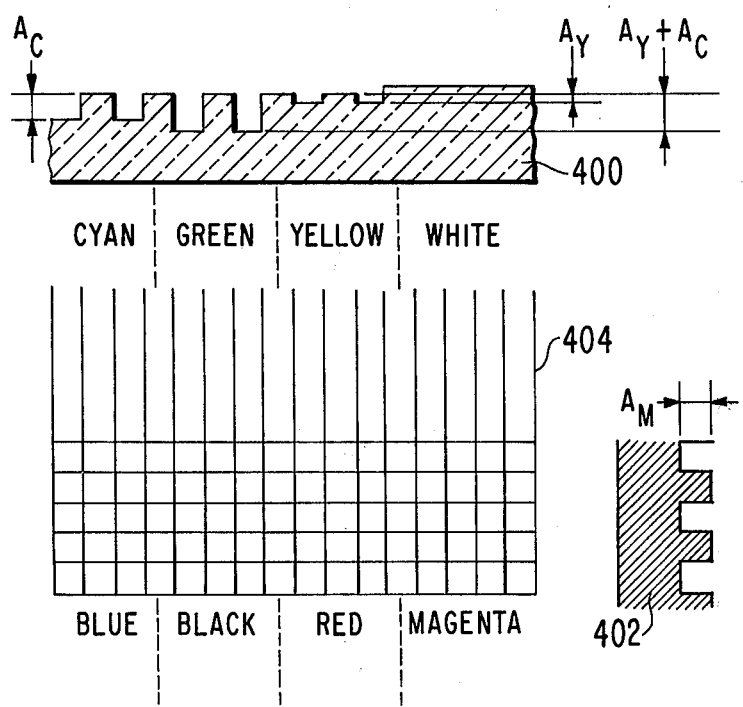

FIG. 1 is a plot line on a CIE color chart showing the wavelength (color) selectivity of the zero-order diffraction light for a square-wave grating, such as shown in FIG. 1a, as a function of the optical amplitude thereof;

FIG. 2 is a CIE chart showing the difference in colorimetric capabilities between a diffractive subtractive color filter incorporating the principles of the present invention and those of the prior art diffractive subtractive color filter of the type disclosed in the aforesaid U.S. Pat. No. 3,957,354 where three superimposed square-wave profile gratings are employed;

FIG. 3 shows a preferred embodiment for recording a single variable optical amplitude square-wave grating for providing cyan, yellow and green zero-order diffraction light, and FIG. 4 shows a gamut of colors obtainable from a variable optical amplitude square-wave grating, when such a variable optical amplitude grating is used alone and when such a variable optical amplitude grating is superimposed on a fixed optical amplitude square-wave grating manifesting magenta, which is angularly displaced 90° with respect thereto.

Referring now to FIGS. 1 and 1a, the invention disclosed in the aforesaid U.S. Pat. No. 3,957,354 shows that the color characteristics of the zero diffraction order light emanating from a square-wave profile diffraction grating illuminated with white light depends solely on the optical amplitude $a$ of the square-wave grating. In particular, the zero diffraction order light from a square-wave profile diffraction grating, as a function of optical amplitude $a$ lies on a certain spiral plot line 100 on the CIE chart. Thus, starting with white light source point 102, spiral plot line 100 extends through optical amplitude points of 200 nm, 300 nm, all the way to an optical amplitude value of more than 1700 nm. In all material respects, FIG. 1 of the present application is identical to FIG. 5 of the aforesaid U.S. Pat. No. 3,957,354.

In the preferred case, the square-wave profile grating is embossed as a surface relief pattern in a transparent medium, such as plastic, having an index of refraction $n$, different from the surrounding air, as shown in FIG. 1a. In this case, the optical amplitude $a$ of the square-wave profile grating is related to the physical amplitude A thereof and the index of refraction $n$ of the transparent medium by the following equation:

$$a = A(n-1) \quad (1)$$

Returning to FIG. 1, there is a certain first optical amplitude $a_Y$ on spiral plot line 100 having a value of 610 nm which manifests a yellow color on the CIE color chart. Similarly, there is a second optical amplitude $a_M$ equal to 780 nm, manifesting magenta, a third optical amplitude $a_C$ equal to 935 nm, manifesting cyan, and a fourth amplitude $a_G$ equal to 1545 nm, manifesting green. Of particular note is the fact that the optical amplitude for green, 1545 nm, just happens to be equal to the sum of the respective optical amplitude for cyan, 935 nm, and yellow, 610 nm. Thus, it is not necessary, as heretofore, to generate green by the subtractive mixture of cyan and yellow, using two superimposed independent square-wave gratings (or other equivalent diffractive structures) one of which has an optical amplitude, such as 935 nm, corresponding to cyan and the other of which has an optical amplitude, such as 610 nm, corresponding to yellow. Instead, a single grating having a variable optical depth, which may be 610 nm, 935 nm or their sum 1545 nm, can be used to provide the respective colors, yellow, cyan and green.

Any optical amplitude in the vicinity of 935 nm corresponds with a cyan color, although of slightly different hue. In a similar manner, any optical amplitude in the vicinity of 610 nm corresponds with a yellow hue and any optical amplitude in the vicinity of 1545 nm corresponds with a green hue. Therefore, the present invention does not require that the selected optical amplitude for cyan be exactly 935 nm and that the selected optical amplitude for yellow be exactly 610 nm. All that is essential is that the respective selected optical amplitudes corresponding to cyan and yellow be such that the sum thereof equals an optical amplitude corresponding to a green hue on spiral plot line 100.

This relationship, where the sum of the optical amplitudes of the subtractive primary colors cyan and yellow is equal to the optical amplitude for their mixture color (green) is unique. For instance, the mixture color for the subtractive primary colors yellow and magenta is red. However, as shown in FIG. 1, an optical amplitude of 1390 nm, equal to the sum of 610 nm, (yellow) and 780 nm (magenta) does not produce a red color, but yields a poor magenta. Similarly, an optical amplitude of 1715 nm, equal to the sum of 935 nm (cyan) and 780 nm (magenta) does not produce blue, the mixture color of the subtractive primary colors cyan and magenta.

Referring now to FIG. 2, there is shown area 200, defined by points C, G*, Y, R, M and B on a CIE chart, which indicates the gamut of colors obtainable with a variable optical amplitude first square-wave grating, having optical depths $a_C$ $a_Y$ and $(a_C+a_Y)$ and/or a fixed optical amplitude second square-wave diffraction grating having an optical amplitude $a_M$. The first and second gratings, which may be superimposed, have different line spacings and/or are angularly displaced from each other to prevent generation of intermodulation and harmonic spatial components, as is known in the art.

Also shown in FIG. 2 is area 202, defined by points C, G, Y, R, M and B on the CIE chart, which define the gamut of colors obtainable with one or more of three independent, superimposed square-wave diffraction gratings having respective optical amplitudes of $a_C$ $a_Y$ and $a_M$. In this latter case, all three diffraction gratings have different line spacings and/or are angularly displaced from each other.

Area 202 corresponds in all material respects to the similar area shown in the CIE chart of FIG. 9 of the aforesaid U.S. Pat. No. 3,957,354. However, in the aforesaid U.S. Pat. No. 3,957,354, the selected optical amplitude for cyan is 920 nm, rather than 935 nm; the selected optical amplitude for yellow is 655 nm, rather than 610 nm, and the selected optical amplitude for magenta is 785 nm, rather than 780 nm. The only reason for this slight change in the selection of the respective optical amplitudes of the three subtractive primary colors (and hence a slight change in the hue exhibited by the three subtractive primary colors) is because the particular hues of cyan, yellow and magenta corresponding respectively to selected optical amplitudes of 935 nm, 610 nm and 780 nm more closely match the subtractive primary color hue standards that already have been developed for color-picture printing inks.

By comparing area 200 with area 202 of FIG. 2, it can be seen that the gamut of colors obtainable employing the principles of the present invention (i.e. area 200) is somewhat extended into the green relative to that obtainable using the prior art approach (area 202). More specifically, the luminous efficiency (brightness) for G* is 44%, while the luminous efficiency for G is only 21%. However, the maximum contrast for area 200 is slightly smaller than that for area 202 (the luminous efficiency for black using area 200 rising to 3.7% from the 2.8% obtained for area 202).

Referring now to FIG. 3, there is shown a preferred technique for recording a variable optical amplitude diffraction grating as a surface relief pattern. More specifically, the recording blank 300 comprises a substrate 302 having a square-wave surface relief diffraction grating such as an embossed plastic or a metal master of predetermined depth $A_1$, embossed thereon. Filling all the grooves of this diffraction grating is a layer of positive photoresist 304. Positive photoresist layer 304 extends a given distance $A_0$ above the ridges of the embossed diffraction grating, as shown. For illustrative purposes, it is assumed that the layer of positive photoresist 304 is divided into four quarters extending from left to right; that the first and second quarters are exposed to light for a first preselected time corresponding to the color cyan; that the second and third quarters are then exposed to light for a second preselected time corresponding to the color yellow, and that the fourth quarter is left unexposed. The value of the first given distance $A_0$ is chosen so that the thickness of photoresist dissolved during development from the fourth, unexposed portion of positive photoresist layer 304 may be equal to $A_0$, but is never greater than $A_0$. The value of the first preselected exposure is chosen so that after development a first certain depth $A_C$, corresponding to the color cyan, of the ridges of the embossed diffraction grating is revealed over the first quarter. In a similar manner, the value of the second preselected exposure is chosen so that a second certain depth $A_Y$, corresponding to the color yellow, is revealed over the third quarter. The predetermined depth $A_1$ in FIG. 3 may then be preselected to have a value, after development, just equal to the sum of $A_C+A_Y$ to avoid a problem caused by the fact that solubility of the positive photoresist rises at a non-linearly increasing rate with exposure. Therefore, the entire layer of positive photoresist 304 is dissolved during development from the second quarter, which received both the first and second preselected exposures to provide the proper grating depth $A_C+A_Y$.

Alternatively, instead of choosing a substrate of a preselected depth $A_1$ just equal to the sum of $A_C+A_Y$, a substrate of larger depth $A_1$ may be used. However, then the distance $A_0$ and the two exposure times corresponding to the color yellow and the color cyan must be chosen to give the correct depth $A_C+A_Y$ In the developed second quarter that corresponds to the color green. in this latter case, the bottom of the grooves of the developed second quarter still contains some photoresist.

In a manner known in the art, a recording made in the manner just described in connection with FIG. 3 may be employed as a master recording to derive a metal stamper for embossing diffractive subtractive filters on the face of a plastic sheet having a known index of refraction. The respective first and second values $A_C$ and $A_Y$ are selected so that they are related with the respective optical amplitudes $a_C$ and $a_Y$ of the diffractive subtractive filter embossed on the plastic sheet by the relationship set forth above in equation (1).

A master recording may be made by other techniques than that discussed above in connection with FIG. 3. For instance, an alternative technique for making a master recording of a diffractive subtractive color filter which may embody the present invention is disclosed in my copending U.S. patent application Ser. No. 694,374, filed June 9, 1976.

In any event, there is produced a diffractive subtractive color filter including variable amplitude diffractive structure 400, shown in FIG. 4, that exhibits a first physical depth $A_C$, corresponding to the optical amplitude of cyan, a second physical depth $A_Y$, corresponding to the optical amplitude of yellow, and a third physical depth equal to $A_Y+A_C$, corresponding to the optical amplitude of green. The diffractive subtractive color filter may include diffractive structure 400 alone or together with diffractive structure 402 having a fixed physical depth $A_M$, corresponding to the optical depth of magenta, which is shown as angularly displaced with respect to diffractive structure 400 by 90°. Further, diffractive structure 402 in FIG. 4 is shown as being only partially superimposed on diffractive structure 400. More specifically, as shown in color diagram 404, diffractive structure 400 alone derives cyan (zero diffraction order light) where the physical depth of the square-wave grating is $A_C$, derives green where the physical depth is $A_Y+A_C$, derives yellow where the physical depth is $A_Y$ and derives white in the absence of a square-wave grating. Where diffractive filter 402 is superimposed on diffractive structure 400, a physical depth of $A_C$ derives blue, a physical depth of $A_Y+A_C$ derives black, a physical depth of $A_Y$ derives red, and the absence of a square-wave grating in diffractive structure 400 derives magenta.

An additional benefit of a diffractive subtractive color filter made in accordance with the present invention, rather than in accordance with the prior art disclosed in the aforesaid U.S. Pat. No. 3,957,354, is that it permits the use of only two gratings crossed at 90°, rather than requiring three gratings normally oriented at 60° with respect to each other. The arrangement of two gratings crossed at 90° gives rise to a diffraction pattern which nicely fits to the square format of the lamp filament as used in most projectors. A square aperture near to the projection lens of the projector then reduces the collimation requirement, thereby relaxing by a factor of at least 1.15 the minimum spatial frequency required to ensure that all the higher diffraction orders are deflected beyond the projector aperture, as compared to the prior art scheme using three gratings oriented at 60° with respect to each other.

As discussed in the aforesaid U.S. Pat. No. 3,957,354, a gray scale may be provided by established screening (half-tone) printing processes. More specifically, cyan, yellow and magenta picture information may be obtained from separate color separation transparencies in which the picture information in each transparency is divided into little dots of variable size, in accordance with gray scale value, each of the dots having a minimum diameter of at least a few grating periods. Such a screening technique fits nicely with the existing technique for producing good color pictures by ink printing.

As further disclosed in the aforesaid U.S. Pat. No. 3,957,354, step-function waveform profiles providing other binary phase-structures may be used instead of square-wave phase grating to generate subtractive primary colors in zero-order diffraction. Therefore, it should be understood that such other binary phase-structures may be substituted for square-wave relief diffraction gratings in the practice of the present invention. In particular, the improvement of the present invention results so long as the same binary pattern step-function waveform profile (watever it may be) is used for both the cyan subtractive primary color and the yellow subtractive primary color, and the respective optical amplitudes corresponding to cyan and yellow of the same binary pattern are added to provide a sum optical amplitude corresponding to green.

What is claimed is:

1. A diffractive substractive color filter responsive to illumination thereof with white light for deriving colored zero order diffraction light, said filter comprising:
   a variable optical amplitude binary phase delay diffractive structure selectively comprising no more than three different optical amplitudes consisting of a given first optical amplitude corresponding to cyan zero order diffraction light, a given second optical amplitude corresponding to yellow zero order diffraction light, and a third optical amplitude substantially equal to the sum of said first and second amplitudes and corresponding to green zero order diffraction light, and
   wherein said structure comprises a plurality of separate regions including a first region, having said third optical amplitude and a second region having solely one of said first and second optical amplitudes.

2. The diffractive subtractive color filter defined in claim 1,
   wherein said plurality of separate regions of said structure includes a third region having solely the other of said first and second optical amplitudes.

3. The diffractive subtractive color filter defined in claim 1, wherein said structure is a square wave diffraction grating having a given line spacing and a variable optical amplitude selectively comprising no more than said three different optical amplitudes, said square wave grating comprising said plurality of separate regions.

4. The diffractive subtractive color filter defined in claim 3, wherein said square wave grating is embossed as a relief pattern in a surface of a transparent medium exhibiting a certain difference in index of refraction with respect to its surroundings,
   wherein a first region of said square wave grating has a physical depth which when multiplied by said certain difference in index of refraction is equal to said third optical amplitude, and
   wherein a second region of said square wave grating has a physical depth which when multiplied by said certain difference in index of refraction is equal solely to said one of said first and second optical amplitudes.

5. The diffractive subtractive color filter defined in claim 4,
   wherein a third region of said square wave grating has a physical depth which when multiplied by said cerain difference in index of refraction is equal solely to said other of said first and second optical amplitudes.

6. The diffractive subtractive color filter defined in claim 1, further comprising:
   a fixed optical amplitude binary phase delay diffractive structure having a given fourth optical amplitude corresponding to magenta zero order diffraction light,
   said fixed optical amplitude binary phase delay diffractive structure being at least partly superimposed on said variable optical amplitude phase delay diffractive structure.

7. The diffractive subtractive color filter defined in claim 6, wherein said variable optical amplitude binary phase delay diffractive structure is a first square wave diffraction grating having a first line spacing, a first angular orientation, and a variable optical amplitude selectively comprising no more than said first mentioned three different optical amplitudes, said first square wave grating comprising said plurality of separate regions and wherein said fixed optical amplitude binary phase delay diffractive structure is a second square wave diffraction grating having a second line spacing and a second angular orientation at least one of which is different from that of said first square-wave grating, and said second square wave grating having said fourth optical amplitude.

8. The diffractive subtractive color filter defined in claim 7,
   wherein each of said first and second square wave gratings are respectively embossed as a relief pattern in a surface of a transparent medium exhibiting a certain difference in index of refraction with respect to its surroundings,
   wherein a first region of said first square wave grating has a physical depth which when multiplied by the certain difference in index of refraction of the medium in which said first square wave grating is embossed is equal to said third optical amplitude,
   wherein a second region of said first square wave grating has a physical depth which when multiplied by the certain difference in index of refraction of the medium in which said first square wave grating is embossed is equal solely to said one of said first and second optical amplitudes, and
   wherein said second square wave grating has a physical depth which when multiplied by the certain difference in index of refraction of the medium in which said second square wave grating is embossed is equal to said fourth optical amplitude.

9. The diffractive subtractive color filter, defined in claim 8,
   wherein a third region of said first square wave grating has a physical depth which when multiplied by the certain difference in index of refraction of the medium in which said first square wave grating is embossed is equal solely to the other of said first and second optical amplitudes.

10. In a method for fabricating a diffractive subtractive color filter which includes the recording of a diffraction grating structure in photoresist for use in embossing a surface relief pattern diffractive structure in a medium having a certain difference in index of refraction from its surroundings; the improvement comprising the steps of:
    providing a recording blank composed of a substrate sheet supporting a layer of positive photoresist where the substrate sheet has a square-wave diffraction grating of a given line spacing and a given physical depth embossed in a face thereof with said layer of photoresist having a thickness which fills the grooves of said grating and extends a given distance beyond the ridges of said grating,
    illuminating at least a first portion of said photoresist layer with cyan-manifesting light to provide a first given exposure of said photoresist layer, and
    then illuminating at least a second portion of said photoresist layer with yellow manifesting light to provide a second given exposure of said photoresist layer,
    said given distance being at least equal to the depth of unexposed areas of said photoresist layer dissolved during development, said first given exposure alone being that required to reveal after development of said photoresist layer a first part of said physical depth of said square wave grating equal to an optical amplitude for said diffractive subtractive color filter manifesting cyan zero order diffraction light divided by said certain difference in index of refraction, said second given exposure alone being that required to reveal after development of said photoresist layer a second part of said physical depth of said square wave grating equal to an optical amplitude for said diffractive subtractive color filter manifesting yellow zero order diffraction light divided by said certain difference in index of refraction, and said given physical depth being substantially equal to the sum of said first and second parts thereof.

11. The method defined in claim 10, further including the step of developing said photoresist after both said first and second exposures thereof.

* * * * *